United States Patent
Licht et al.

(10) Patent No.: US 11,379,806 B2
(45) Date of Patent: Jul. 5, 2022

(54) VIRTUAL REALITY TRANSACTION INTEGRATION

(71) Applicant: NCR Corporation, Duluth, GA (US)

(72) Inventors: Yehoshua Zvi Licht, Alpharetta, GA (US); Nir Veltman, Johns Creek, GA (US); Patrick Goode Watson, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 402 days.

(21) Appl. No.: 15/471,532

(22) Filed: Mar. 28, 2017

(65) Prior Publication Data

US 2018/0204196 A1 Jul. 19, 2018

Related U.S. Application Data

(60) Provisional application No. 62/446,630, filed on Jan. 16, 2017.

(51) Int. Cl.
*G06Q 20/12* (2012.01)
*G06Q 20/34* (2012.01)
*G06Q 20/36* (2012.01)

(52) U.S. Cl.
CPC .......... *G06Q 20/12* (2013.01); *G06Q 20/351* (2013.01); *G06Q 20/367* (2013.01); *G06Q 2220/00* (2013.01)

(58) Field of Classification Search
CPC .... G06Q 20/12; G06Q 20/351; G06Q 20/367; G06Q 2220/00
See application file for complete search history.

(56) References Cited

U.S. PATENT DOCUMENTS

| | | | |
|---|---|---|---|
| 9,092,600 B2 * | 7/2015 | Scavezze | G06F 21/36 |
| 2017/0103440 A1 * | 4/2017 | Xing | G06F 3/04883 |
| 2017/0364920 A1 * | 12/2017 | Anand | H04L 63/0861 |
| 2018/0150831 A1 * | 5/2018 | Dolan | G06Q 20/367 |
| 2018/0157820 A1 * | 6/2018 | Adams | G06K 9/00892 |

* cited by examiner

*Primary Examiner* — John W Hayes
*Assistant Examiner* — Ari Shahabi
(74) *Attorney, Agent, or Firm* — Schwegman, Lundberg & Woessner

(57) ABSTRACT

A Virtual Reality (VR) system and method are provided that integrates transaction processing. A VR session customer transaction information is obtained and a transaction is concluded with the transaction information during the VR session.

6 Claims, 4 Drawing Sheets

VIRTUAL REALITY TRANSACTION INTEGRATION

RELATED APPLICATIONS

This application claims priority to U.S. Provisional Application Ser. No. 62/446,630 entitled: "Completing Payments within a Virtual Room," filed on Jan. 16, 2017; the disclosure of which is incorporated by reference herein in its entirety.

BACKGROUND

In Virtual Reality (VR) a VR room is provided for a VR session. Today, the VR room may include goods for purchase by customers but actually performing the payment processing for the goods occurs before the VR session or after the VR session and outside the VR room. This is inconvenient and cumbersome for both the retailer and the customer participating the VR session.

SUMMARY

In various embodiments, methods and a system for Virtual Reality (VR) transaction integration are presented.

According to an embodiment, a method for VR transaction integration is provided. Specifically, and in an embodiment, transaction information is obtained to conclude a transaction of a customer during a VR session. The transaction is completed using the transaction information during the VR session.

DETAILED DESCRIPTION

Figure 1:
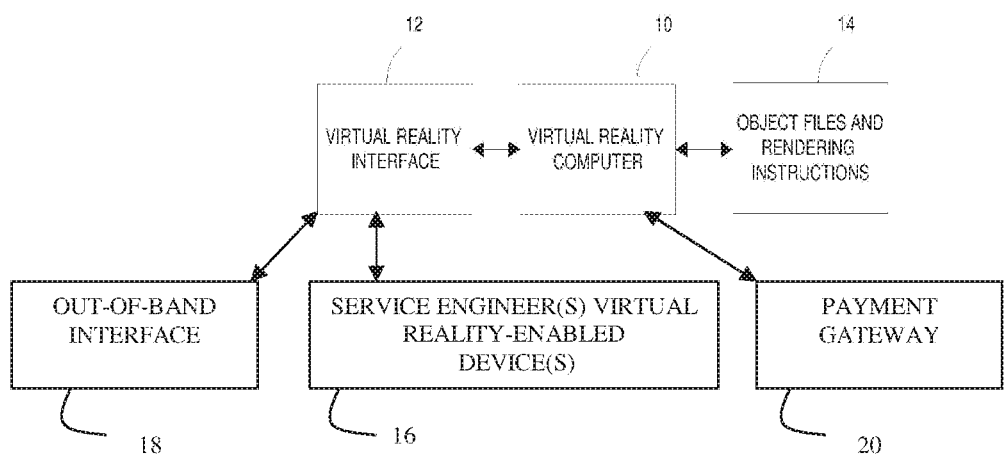
FIG. 1 is a diagram of a system for VR transaction integration, according to an example embodiment.

FIG. 1 is a diagram of a system for VR transaction integration, according to an example embodiment. The system is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the VR transaction integration techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for VR transaction integration can be implemented in all, or some combination of the components shown in different hardware computing devices having one or more hardware processors.

The system includes: a VR computer 10, a VR interface, object files and rendering instructions 14, one or more service engineer VR-enabled devices 16, and out-of-band interface 18, and a payment gateway 20.

The VR computer 10 executes VR software, which establishes a three-dimensional (3D) virtual room or world within which one or more VR sessions (stories) can be processed.

In one example, the VR computer 10 is part of a cloud-based system connected to a network, which may include a global communications network, also known as the Internet. VR computer 10 can include one or more processors, memory, and program and data storage.

The VR interface connects to VR computer 10 and may include a variety of VR-enabled devices 16 and input device that connects to the VR computer 10 for a VR session/story over the network.

Any VR session may also be configured with relevant object files and rendering instructions 14 available and interfaced to the VR computer 10. In an embodiment, the VR computer 10 receives as input to a VR session Computer-Assisted Design (CAD) files and program instructions 14 for creating virtual representations of a real-world objects such as products or goods offered for sale by retailers. The actual real-world products or goods may be stored in warehouses and shipped to customers following purchase transactions made within VR sessions and VR rendered rooms for those VR sessions.

A customer participants in a VR session through a rendered VA room representing a real-world of real-world depiction of a room. Within the room a variety of products or goods are visible as rendered virtual objects. Using the VR-enabled devices 16 operated by the customer and connected through the VR interface 12, the customer can manipulate the objects (goods or services) and place them in a cart depicted within the VR room. Typically, at this point in time the customer would have to log out of the VR room and access an ecommerce site through a computing device's browser to complete the purchase of the goods or services. Such is not the case with the teachings presented herein.

A customer can get to the point in which the customer desires to pay for any purchased goods or services in a few of manners. For example, the customer may have been accessing an ecommerce site through a browser interface during an out-of-band communication to the VR session and clicked an option on that browser site to create and migrate from the ecommerce site to a VR session. As another example, the customer may be actively participating within a VR session when the customer identifies goods or products for purchase. In both scenarios, and unlike traditional approaches, the customer checks out and completes payment for any desired goods or products from within the VR session (a VR session created after migrating from an out-of-band (again out-of-band to the VR session) or an existing VR session from which the customer identifies the goods or products and completes a checkout process). The typical payment processing occurs out-of-band to the VR session.

The payment processing is completed through a payment gateway 20 that interfaces with the VR computer 10 to bridge the VR session to a conventional payment gateway (such as credit cards, gift cards, bank transfers, virtual currency, and the like). An Application Programming Interface (API) of the payment gateway 20 receives transaction and payment details from the VR computer 10 through the VR session and translates that information into a format recognized by a conventional ecommerce payment gateway.

Before the payment processing can be completed, the customer must present a payment method, such as a payment card, for payment of a transaction occurring in the VR session for the customer-identified goods or products.

The manner in which the customer provides a payment card for completing a transaction during the VR session can occur in a variety of manners. For example, and in a first scenario, the customer may have transitioned from an ecommerce site during an out-of-band initial interaction of the customer during an ecommerce session and the ecommerce site has one or more registered payment cards for the customer. In a second scenario, the customer may have transitioned from an ecommerce session where no previous registered payment cards were available to the ecommerce site. In a third scenario, the customer may have conducted the entire purchasing interaction within a VR session where a previously registered payment card for the customer was registered with the VR computer 10. In a fourth scenario, the customer may have conducted the entire purchasing interaction within a VR session where no previously registered payment cards for the customer were registered with the VR computer 10. In a fifth scenario, the customer may have payment card accessible as payment within the VR session on a mobile device that is in the possession of the customer during the VR session. Each of these scenarios will now be discussed in turn.

In the first scenario, where the customer transitions from an ecommerce site to a newly created VR session, can proceed as follows. The out-of-band interface 18 obtains the ecommerce session token when the customer accesses an option to migrate from the out-of-band ecommerce session to a newly created VR session. The token includes the customer identifier for the customer known to the ecommerce site and the ecommerce session identifier for the ecommerce session that was occurring with the customer in the out-of-band session. This provides the VR interface 12 with a link to the ecommerce session and details available in the account of the customer with the ecommerce site though interaction between the VR interface 12 with the out-of-band interface 18 bridge. The out-of-band interface 12 uses an API to access the ecommerce session or ecommerce site. Such that when the customer, checks out of the VR session and desires to pay for a good or product, the VR interface 12 interacts with the out-of-band interface 18, and the out-of-band interface 18 accesses the ecommerce site or existing ecommerce session using the customer identifier and/or the session identifier available in the token. Using the API of the ecommerce site, the out-of-band interface 18 accesses an account of the customer with the ecommerce site and obtains the registered payment cards that have been registered by the customer with the ecommerce site. These payment cards are passed back to the VR interface 12 during the VR session and presented as options for selection to checkout to the customer within the VR room. The customer selects the payment card desired using the VR-input device 16 and the payment for the transaction concludes either through the payment gateway 20 or back through the out-of-band interface 18 that is interacting with the ecommerce site for out-of-band communications to conclude the transaction.

In an embodiment, the registered payment cards may be presented as real-world payment cards within the VR room.

In the second scenario, the customer has no registered payment cards with the ecommerce site but migrated from the site to the VR session for concluding payment. Assuming the customer also has no previously registered payment card with the VR computer 10, a new payment mechanism can be registered by the customer prior to checking out and concluding payment within the VR session. This can occur by presenting to the customer the necessary information for the customer to use the VR-input device 16 to register a payment card. Alternative, if the VR-input device 16 is equipped with a forward-facing camera, the customer can place a desired payment card in view of the camera's field of view and an image of the payment card is captured. Optical Character Recognition (OCR) processing then takes place within the VR session and the payment card is registered. The customer may also select an option to have the now-registered payment card back with the ecommerce from which the customer migrated. In this case, the out-of-band interface 18 uses its API to interact with the ecommerce site or session using the customer identifier and the session identifier and register the payment card with the ecommerce site on behalf of the customer. The VR computer 10 then passes the newly acquired payment card details to the payment gateway 20 for completing the customer transaction. Alternatively, the out-of-band interface 20 accesses the ecommerce out-of-band session and completes the transaction with the ecommerce site.

In the third scenario, the VR session obtains a registered payment card previously registered for the customer. If more than one payment card is available, the customer can select the desired card within the VR room. The VR computer 10 passes the payment details of the card to the payment gateway 20, which interacts using an API with a conventional payment gateway to conclude the customer's transaction and pay for any goods or services that the customer had for the transaction.

In the fourth scenario, the processing proceeds in a similar manner presented above with respect to the second scenario. The only difference being that no newly identified payment card is registered with an ecommerce site, since the customer never transitioned to the VR session from an existing ecommerce session.

In the fifth scenario, the customer may have no known payment card registered with an ecommerce site or with the VR computer 10. The commerce can also have migrated from an ecommerce site or originated for the entire transaction within the VR session for the fifth scenario. Additionally, the fifth scenario is available as a presented option within the VR room of the VR session even when other known registered payment cards for either the VR session or an ecommerce site are known or discovered on behalf of the customer. The out-of-band interface 18 sends a push notification to a mobile wallet application on the customer's mobile device, this initiates the payment card from the mobile device for payment during the VR session. The customer feels and places a finger or thumb over the fingerprint reader and the mobile wallet verifies and sends the payment card details to the out-of-band interface 18. This is communicated through the VR interface 12 and payment completed through the payment gateway 20. In another case, the phone may display the payment card details as a QR code and assuming the VR-input device 16 includes a forward facing camera, the customer positions the QR code in front of the camera and the payment details are provided for processing during the VR session.

With each of the scenarios a variety of authentication mechanism can be processed during the payment processing within the VR session and/or for purposes of verifying the identity of the customer within the VR session. For example, a virtual Personal Identification Number (PIN) pad may be displayed within the VR room where the customer uses the VR-input device 16 to enter a multi-digit code (4-8 or 6-8). The VR-input device 16 may be equipped with location services to verify that the customer is in a known physical location known to the VR computer 10 as being associated with customer. The customer's fingerprint reader on a customer's mobile device (such as watch, phone, or tablet) can be accessed and communicated whether valid or not through the out-of-band interface 18. A QR or barcode can be scanned from the display of the consumer's mobile device using a forward-facing camera of the VR input device 16, the customer can be asked to repeat a phrase and voice recognition used for authenticating the customer, audible questions can be asked during the VR session and the customer's audible answers used to verify the customer, written questions and answers used, and others. It is also noted that the multiple forms of authentication can be used of different types for purposes of authentication. The authentication can be used for authenticating the customer for an ecommerce session transferred to the VR session, for payment confirmation, and other situations.

In an embodiment, the ecommerce session is transferred from a voice-based interaction with an automated network-enabled voice device, such as Echo® and Google Home®, to the VR session. In an embodiment, the ecommerce session is transferred from an automated messaging session that utilizes automated chat bats to the VR session.

In each of the various embodiments presented above, the customer remains in the VR session for completion of the payment processing to conclude a transaction for purchasing goods or products. It is noted that goods or products includes services that are being sold by a retailer.

These and other embodiments are now discussed with reference to the FIGS. 2-4.

Figure 2:
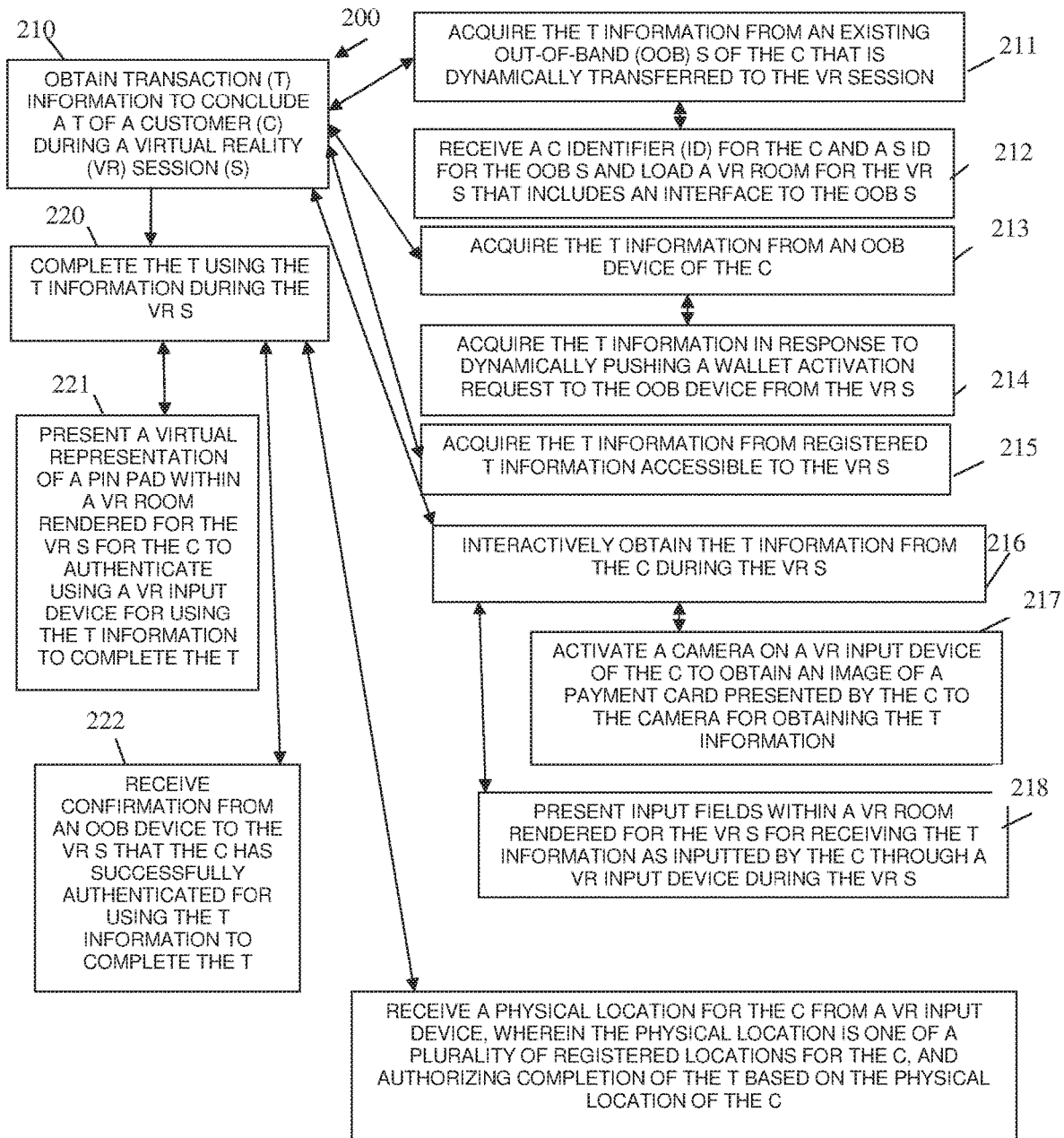
FIG. 2 is a diagram of a method for VR transaction integration, according to an example embodiment.

FIG. 2 is a diagram of a method 200 for VR transaction integration, according to an example embodiment. The software module(s) that implements the method 200 is referred to as a "VR transaction manager." The VR transaction manager is implemented as executable instructions programmed and residing within memory and/or a non-transitory computer-readable (processor-readable) storage medium and executed by one or more hardware processors of a hardware computing device. The processors of the device that executes the VR transaction manager are specifically configured and programmed to process the VR transaction manager. The VR transaction manager has access to one or more networks during its processing. The networks can be wired, wireless, or a combination of wired and wireless.

In an embodiment, the device that executes the VR transaction manager is a single device or set of devices that process in a cloud processing environment.

In an embodiment, the device that executes the VR transaction manager is a server.

In an embodiment, the VR transaction manager all or some combination of the VR interface 12, the VR software executing on the VR computer 10, the payment gateway 20, and/or the out-of-band interface 18.

At 210, the VR transaction manager obtains transaction information to conclude a transaction of a customer during a VR session. The transaction information can include a variety of information such as transaction details, including: identifiers for goods, products, or services, price for each item purchased, retailer identifier selling the item, a delivery or pickup address for a customer, a customer identifier, and payment details for payment of the items in the transaction.

According to an embodiment, at 211, the VR transaction manager acquires the transaction information from an existing out-of-band session of the customer that is dynamically transferred or lined to the VR session. That is, the customer, through a session outside of the VR session has a session with a retailer to purchase items transferred dynamically or linked dynamically with the VR session.

In an embodiment of 211 and at 212, the VR transaction manager receives a customer identifier for the customer and a session identifier for the out-of-band session and the VR transaction manager loads a VR room for the VR session than includes an interface to the out-of-band session. In an embodiment, this is achieved through the out-of-band interface 18.

In an embodiment, at 213, the VR transaction manager acquires the transaction information from an out-of-band device of the customer. For example, the transaction information is obtained from a mobile phone or mobile tablet that is not associated with the VR session. The manners in which the transaction information is obtained from the out-of-band device were described above with reference to the FIG. 1.

In an embodiment of 213 and at 214, the VR transaction manager acquires the transaction information in response to a dynamically pushed notification sent by the VR transaction manager to automatically activate a wallet application on the out-of-band device. This situation was described above with reference to the FIG. 1.

In an embodiment, at 215, the VR transaction manager acquires the transaction information from registered transaction information that is accessible to the VR session. This is a situation where the transaction information was previously registered by the customer and that previous registration In an embodiment, at 216, the VR transaction manager interactively obtains the transaction information from the customer during the VR session and within the VR room rendered for the VR session.

In an embodiment of 216 and at 217, the VR transaction manager activates a camera on a VR input device of the customer to obtain an image of a payment card presented by the customer to the camera for obtaining the transaction information. OCR processing is performed on the image to recognize the payment information.

In an embodiment of 216 and at 218, the VR transaction manager presents input fields within a VR room rendered for the VR room for receiving the transaction information as inputted by the customer through a VR input device operated by the customer during the VR session.

At 220, the VR transaction manager completes the transaction using the transaction information during the VR session.

In an embodiment, at 221, the VR transaction manager presents a virtual representation of a PIN pad within the VR room rendered for the VR session for the customer to authenticate using a VR input device for using the transaction information to complete the transaction.

In an embodiment, at 222, the VR transaction manager receives confirmation from an out-of-band device to the VR session that the customer has successfully authenticated for using the transaction information to complete the transaction.

According to an embodiment, at 223, the VR transaction manager receives a physical location from the customer from a VR input device. The physical location is one of a plurality of registered locations for the customer. The VR transaction manager, then authorizes completion of the transaction based on the physical location of the customer.

Figure 3:
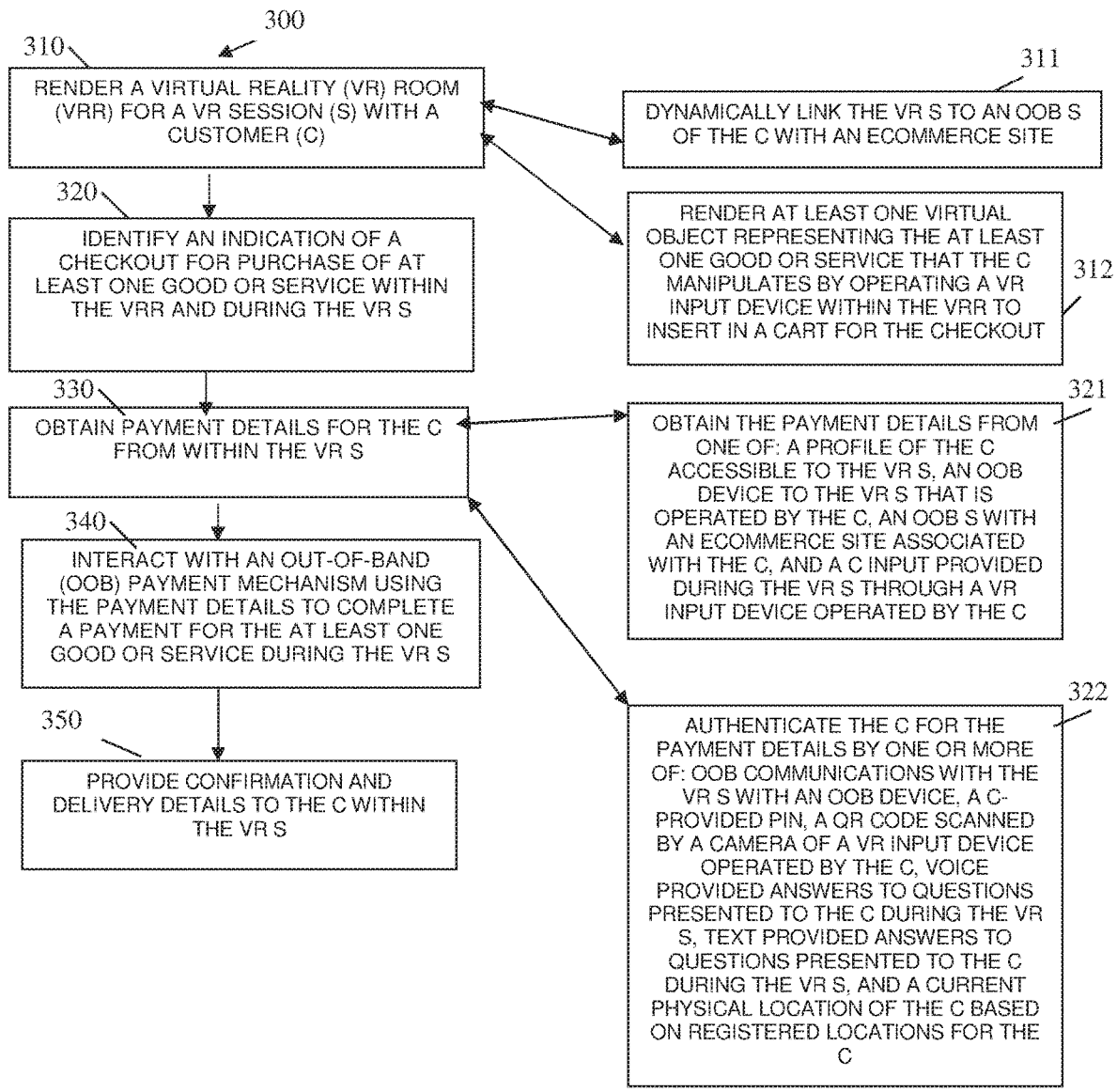
FIG. 3 is a diagram of another method VR transaction integration, according to an example embodiment.

FIG. 3 is a diagram of another method 300 for VR transaction integration, according to an example embodiment. The software module(s) that implements the method 300 is referred to as a "VR integration manager." The VR integration manager is implemented as executable instructions programmed and residing within memory and/or a non-transitory computer-readable (processor-readable) storage medium and executed by one or more hardware processors of a hardware device. The processors of the device that executes the VR integration manager are specifically configured and programmed to process VR integration manager. The VR integration manager has access to one or more networks during its processing. The networks can be wired, wireless, or a combination of wired and wireless.

In an embodiment, the device that executes the VR integration manager is a single device or set of devices that process in a cloud processing environment.

In an embodiment, the device that executes the VR integration manager is a server.

In an embodiment, the VR integration manager all or some combination of the VR interface 12, the VR software executing on the VR computer 10, the payment gateway 20, the out-of-band interface 18, and/or the method 200.

At 310, the VR integration manager enders a VR room for a VR session with a customer.

In an embodiment, at 311, the VR integration manager dynamically links the VR session to an out-of-band session that the customer has with an ecommerce site. This session can be through a website, an automated voice-network enabled device, an automated messaging chat bot, and the like.

According to an embodiment, at 312, the VR integration manager renders at least one virtual object representing the at least one good or service that the customer manipulates by operating a VR input device within the VR room to insert the virtual object into a cart represented in the VR room for checkout.

At 320, the VR integration manager identifies an indication of a checkout for purchase of at least one good or service within the VR room and during the VR session.

In an embodiment, at 321, the VR integration manager obtains the payment details from one of: a profile of the customer accessible to the VR session, an out-of-band device to the VR session that is operated by the customer, an out-of-band session with an ecommerce site associated with the customer, and a customer input provided during the VR session through a VR input device operated by the customer.

According to an embodiment, at 322, the VR integration manager authenticates the customer for the payment details by one or more of: out-of-band communications with the VR session with an out-of-band device, a customer-provided PIN, a QR code scanned by a camera of a VR input device operated by the customer, voice provided answers to questions presented to the customer during the VR session, text provided answers to questions presented to the customer during the VR session, and a current physical location of the customer based on registered locations for the customer.

Figure 4:
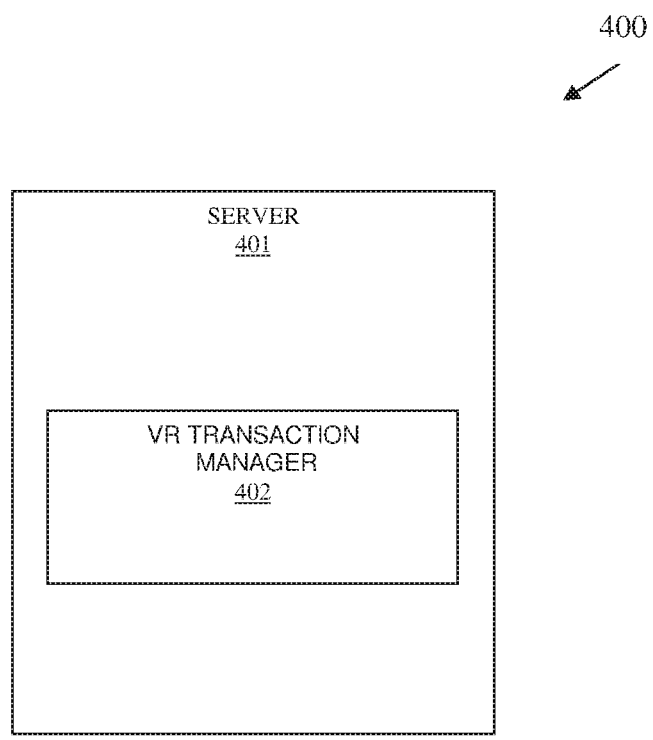
FIG. 4 is a diagram of another system for VR transaction integration, according to an example embodiment.

FIG. 4 is a diagram of another system 400 for transaction integration, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the processing described above with the FIG. 1.

In an embodiment, the system 400 implements, inter alia, the method 200 of the FIG. 2.

In an embodiment, the system 400 implements, inter alia, the method 300 of the FIG. 3.

The system 400 includes a server 401 and the server including VR transaction manager 402.

The VR transaction manager 402 is configured to: 1) execute on one or more processors of the server 401, 2) obtain payment details for a transaction of a customer during a VR session within a VR room render for the VR session, and 3) complete the transaction with the payment details from within the VR session.

In an embodiment, the VR transaction manager 402 is further configured in 2) to authenticate the customer for processing the payment details within the VR room and during the VR session.

In an embodiment, the VR transaction manager 402 is all or some combination of: the VR interface 12, the VR software executing on the VR computer 10, the payment gateway 20, the out-of-band interface 18, the method 200, the method 300, and/or some combination of these.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   interacting, by a processor of a device, with an out-of-band interface;
   obtaining, by the processor from the out-band interface, an ecommerce session token indicating that a customer accessed an option to migrate from an out-of-band ecommerce session associated with an ecommerce site to a Virtual Reality (VR) session, wherein the ecommerce session token comprising a customer identifier for the customer and an ecommerce session identifier for the ecommerce session;
   establishing, by the processor, the VR session, wherein the VR session comprises a three-dimensional (3D) Virtual Reality (VR) room, and wherein the 3D VR room comprises a real-world depiction of a room having goods or products visible as virtual objects within the 3D VR room;

obtaining, by the processor, transaction information associated with a transaction of the customer based on interactions with the virtual objects within the 3D VR Room during the VR session with the virtual objects manipulated within the 3D VR Room and identifying selected goods or selected products within a cart depicted as a specific object within the 3D VR Room, wherein actual real-world goods or actual real-world products corresponding to the selected goods or the selected products are stored in warehouses, wherein the selected goods or the selected products and the cart are special virtual objects tracked within the 3D VR room but are not actually present within a physical environment of the customer during the VR session, wherein the transaction information associated with the selected goods or the selected products that are located within the cart comprises identifiers for goods or products of the transaction, prices of the goods or the products, a retailer identifier for a retailer that is selling the goods or the products, and the customer identifier;

detecting, by the processor, activation of a payment option presented within the 3D VR room that was activated by the customer during the VR session;

obtaining, by the processor, payment cards registered to the customer at the ecommerce site using the customer identifier and the out-of-band interface;

presenting, by the processor, the payment cards for selection by the customer within the 3D VR room during the VR session;

receiving, by the processor, a selected payment card from the customer that is selected through a VR input device by the customer during the VR session; and processing, by the processor, a payment for the transaction comprising the transaction information through a payment gateway using the selected payment card and the transaction information or through the out-of-band interface by interacting with the ecommerce site using the customer identifier, the ecommerce session identifier, the selected payment card, and the transaction information.

2. The method of claim 1, wherein obtaining the transaction information further includes activating a camera on the VR input device and obtaining an image, associating the image with one of the identifiers for one of the specific goods or one of the specific products as a portion of the transaction information.

3. The method of claim 1, wherein obtaining the transaction information further includes presenting input fields within the 3D VR room and receiving another portion of the transaction information based on inputted data made by the customer into the input fields through the VR input device during the VR session.

4. The method of claim 1, wherein processing the payment further includes presenting a virtual representation of a Personal Identification Number (PIN) pad within the 3D VR room, and authenticating the customer based on a PIN that is inputted on the PIN pad by the customer using the VR input device.

5. The method of claim 1, wherein processing the payment further includes receiving a confirmation from an out-of-band device to the VR session through the out-of-band interface that the customer has successfully authenticated for using the transaction information to pay for the transaction.

6. The method of claim 1, wherein processing the payment further includes receiving a physical location for the VR input device from the VR input device while operated by the customer, associating the physical location with one of a plurality of registered locations that was registered for the customer, and authorizing the processing of the payment for transaction based on the physical location of the VR input device being operated by the customer.

* * * * *